(12) United States Patent
Sultana et al.

(10) Patent No.: US 12,168,902 B1
(45) Date of Patent: Dec. 17, 2024

(54) WINDOW

(71) Applicants: Trevor M. Sultana, Mountain View, CA (US); Ali Tavakoli Targhi, San Jose, CA (US); Steven H. Klotz, Austin, TX (US); Luis E. Mejia-Elizarraras, San Jose, CA (US)

(72) Inventors: Trevor M. Sultana, Mountain View, CA (US); Ali Tavakoli Targhi, San Jose, CA (US); Steven H. Klotz, Austin, TX (US); Luis E. Mejia-Elizarraras, San Jose, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 18/131,455

(22) Filed: Apr. 6, 2023

Related U.S. Application Data

(60) Provisional application No. 63/349,605, filed on Jun. 7, 2022.

(51) Int. Cl.
*E05D 15/58* (2006.01)
*E05D 15/22* (2006.01)
(Continued)

(52) U.S. Cl.
CPC ........... *E05D 15/582* (2013.01); *E05D 15/22* (2013.01); *B60J 1/14* (2013.01); *B60J 1/17* (2013.01);
(Continued)

(58) Field of Classification Search
CPC ........ B60J 1/14; B60J 1/17; B60J 5/04; E05D 2015/586; E05D 15/58; E05D 15/22; E05D 15/20; E05D 15/56; E05D 15/156; E05F 15/697; E06B 7/32; E06B 2003/7044; E06B 3/4636
(Continued)

(56) References Cited

U.S. PATENT DOCUMENTS

| | | |
|---|---|---|
| 1,911,697 A | 5/1933 | Levan |
| 2,844,405 A | 7/1958 | Roethel |

(Continued)

FOREIGN PATENT DOCUMENTS

| | | | |
|---|---|---|---|
| DE | 3037397 A1 | 4/1982 | |
| DE | 3438580 A * | 4/1986 | ............... B60J 1/17 |

(Continued)

OTHER PUBLICATIONS

Machine translation of FR2339048A.*
Machine translation of DE3438580A1.*

*Primary Examiner* — Marcus Menezes
(74) *Attorney, Agent, or Firm* — Young Basile Hanlon & MacFarlane, P.C.

(57) ABSTRACT

A window assembly includes a support and a window frame having a first frame portion pivotally connected to a second frame portion. The second frame portion is connected to the support for movement with respect to the support. A window is connected to the first frame portion of the window frame. The window is movable between a closed position and an open position by pivoting of the window and the first frame portion of the window frame with respect to the second frame portion of the window frame and by relative sliding motion of the second frame portion of the window frame along the support.

19 Claims, 8 Drawing Sheets

(51) Int. Cl.
*B60J 1/14* (2006.01)
*B60J 1/17* (2006.01)
*E05F 15/689* (2015.01)

(52) U.S. Cl.
CPC .... *E05D 2015/586* (2013.01); *E05F 15/6909* (2024.01); *E05Y 2201/434* (2013.01); *E05Y 2201/654* (2013.01); *E05Y 2201/684* (2013.01); *E05Y 2201/686* (2013.01); *E05Y 2900/55* (2013.01)

(58) Field of Classification Search
USPC .................................................. 49/209, 374
See application file for complete search history.

(56) References Cited

U.S. PATENT DOCUMENTS

| | | | |
|---|---|---|---|
| 2,917,792 A * | 12/1959 | Franzblau | E06B 3/4609 403/295 |
| 2,992,039 A | 7/1961 | Bretzner | |
| 3,802,125 A | 4/1974 | Baker | |
| 3,844,064 A | 10/1974 | Yamaha et al. | |
| 4,094,100 A | 6/1978 | Fukumoto et al. | |
| 4,575,967 A | 3/1986 | Bickerstaff | |
| 4,730,414 A * | 3/1988 | Nakamura | E05F 11/486 49/374 |
| 4,771,575 A * | 9/1988 | Tiesler | B60J 10/79 49/377 |
| 4,785,582 A | 11/1988 | Tokue et al. | |
| 4,788,794 A | 12/1988 | Miller | |
| 4,819,377 A | 4/1989 | Bauer et al. | |
| 4,829,711 A | 5/1989 | Sambor | |
| 4,927,207 A | 5/1990 | Kishino | |
| 4,956,942 A | 9/1990 | Lisak et al. | |
| 5,009,461 A | 4/1991 | Smith-Horn et al. | |
| 5,016,392 A | 5/1991 | Thomas et al. | |
| 5,038,519 A | 8/1991 | Huebner | |
| 5,054,238 A | 10/1991 | Glossop, Jr. et al. | |
| 5,086,586 A | 2/1992 | Hlavaty et al. | |
| 5,099,611 A | 3/1992 | Kracht et al. | |
| 5,142,824 A * | 9/1992 | Le Compagnon | E05F 11/481 49/374 |
| 5,159,781 A | 11/1992 | Glossop, Jr. et al. | |
| 5,249,392 A | 10/1993 | Houston et al. | |
| 5,433,031 A * | 7/1995 | Dailey | E05F 15/40 49/27 |
| 5,855,095 A | 1/1999 | Dedrich et al. | |
| 5,927,021 A | 7/1999 | Kowalski et al. | |
| 5,960,588 A | 10/1999 | Wurm et al. | |
| 6,029,403 A | 2/2000 | Bertolini et al. | |
| 6,283,534 B1 | 9/2001 | Mrozowski et al. | |
| 6,416,144 B1 | 7/2002 | Houston et al. | |
| 6,425,208 B1 | 7/2002 | Klueger et al. | |
| 6,560,930 B2 | 5/2003 | de Gaillard | |
| 6,561,567 B1 * | 5/2003 | Mrozowski et al. | |
| 6,799,394 B2 | 10/2004 | Tsung-Lin | |
| 6,952,898 B2 | 10/2005 | Castellon | |
| 7,121,042 B2 | 10/2006 | Robert et al. | |
| 7,246,464 B2 | 7/2007 | Castellon | |
| 7,743,559 B2 | 6/2010 | Papi et al. | |
| 8,069,610 B2 | 12/2011 | Graf et al. | |
| 8,127,493 B2 | 3/2012 | Cappelli et al. | |
| 8,572,898 B2 | 11/2013 | Grudzinski et al. | |
| 8,646,209 B2 | 2/2014 | Hampel et al. | |
| 9,254,733 B2 | 2/2016 | Costigan et al. | |
| 9,932,758 B2 | 4/2018 | Genta | |
| 10,512,351 B1 * | 12/2019 | Valeriano | E05B 47/0001 |
| 10,730,371 B2 | 8/2020 | Migaki et al. | |
| 11,085,234 B2 * | 8/2021 | Hunt | E06B 7/28 |
| 11,225,830 B2 | 1/2022 | Liu et al. | |
| 11,319,742 B2 | 5/2022 | Bose et al. | |
| 11,851,926 B1 | 12/2023 | Sultana et al. | |
| 2003/0009948 A1 | 1/2003 | Nishikawa et al. | |
| 2003/0150165 A1 | 8/2003 | Ronay et al. | |
| 2004/0148864 A1 | 8/2004 | Pax et al. | |
| 2006/0010776 A1 | 1/2006 | Jutzi | |
| 2006/0283088 A1 | 12/2006 | Buchta | |
| 2007/0101658 A1 | 5/2007 | Heyer | |
| 2008/0148647 A1 | 6/2008 | Pavlovic | |
| 2010/0011668 A1 | 1/2010 | Broadhead et al. | |
| 2012/0167511 A1 * | 7/2012 | Laudenklos | E06B 7/32 52/386 |
| 2017/0350185 A1 * | 12/2017 | Kuan | E06B 3/481 |
| 2019/0210432 A1 | 7/2019 | Frederick et al. | |
| 2019/0323282 A1 * | 10/2019 | Sowinski | E06B 3/488 |
| 2020/0131842 A1 * | 4/2020 | Thomas | E06B 9/52 |
| 2020/0247220 A1 | 8/2020 | Lorentsson et al. | |
| 2021/0206239 A1 | 7/2021 | Ishiguro et al. | |
| 2022/0032745 A1 * | 2/2022 | Toyota | B60J 1/17 |

FOREIGN PATENT DOCUMENTS

| | | | |
|---|---|---|---|
| DE | 3438580 A1 | 4/1986 | |
| DE | 3740034 A1 | 6/1989 | |
| EP | 0369680 A2 | 5/1990 | |
| EP | 1783310 A1 | 5/2007 | |
| FR | 2339048 A * | 9/1977 | B60J 1/17 |
| FR | 2932723 A1 | 12/2009 | |
| JP | S5755615 U | 4/1982 | |
| JP | S58-158935 U | 10/1983 | |
| JP | 859186729 A | 10/1984 | |
| JP | S59-186341 U | 12/1984 | |
| JP | S62-129228 U | 8/1987 | |
| JP | H04-275955 A | 10/1992 | |
| JP | 2001-18655 A | 1/2001 | |
| WO | 2014037448 A1 | 3/2014 | |
| WO | 2022260819 A1 | 12/2022 | |

* cited by examiner

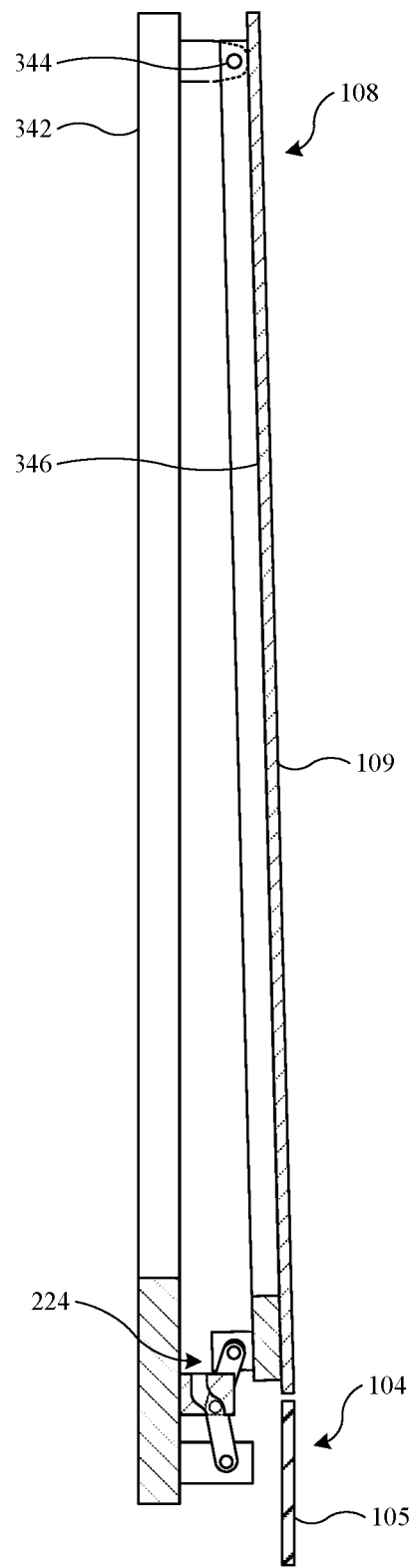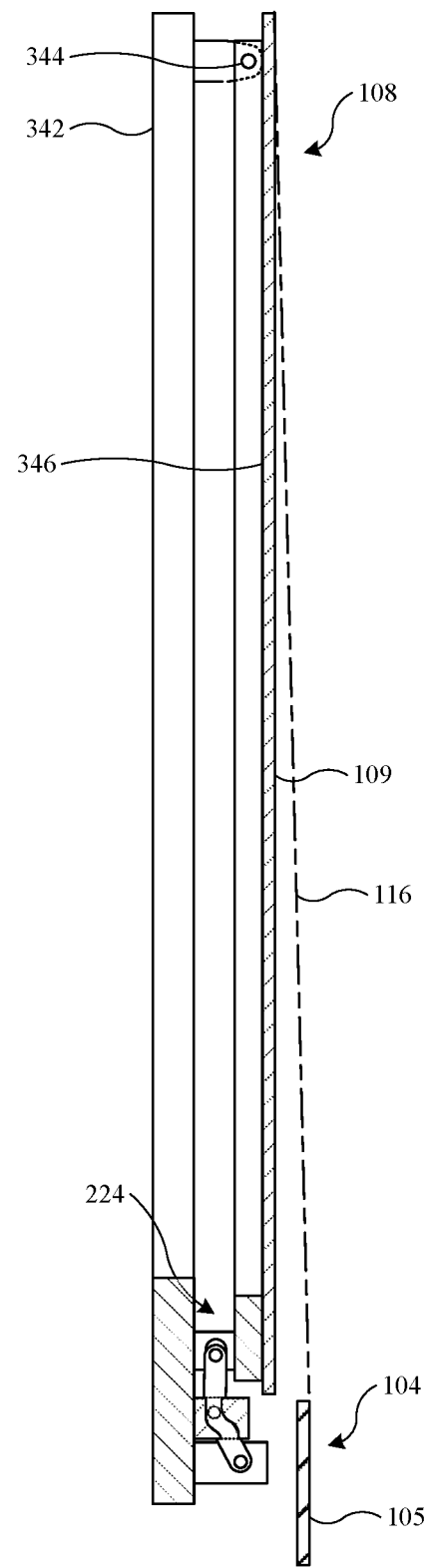
*FIG. 3C*     *FIG. 3D*

WINDOW

CROSS-REFERENCE TO RELATED APPLICATIONS

This application claims the benefit of U.S. Provisional Application No. 63/349,605, filed on Jun. 7, 2022, the content of which is hereby incorporated herein in its entirety for all purposes.

FIELD

The present disclosure relates generally to the field of windows.

BACKGROUND

Some windows can be opened to allow outside air to enter an interior. As an example, a window may move from a closed position to an open position by lowering into a door.

SUMMARY

One aspect of the disclosure is a window assembly that includes a support, a window frame, and a window. The window frame includes a first frame portion pivotally connected to a second frame portion. The second frame portion is connected to the support for movement with respect to the support. The window is connected to the first frame portion of the window frame. The window is movable between a closed position and an open position by pivoting of the window and the first frame portion of the window frame with respect to the second frame portion of the window frame and by relative sliding motion of the second frame portion of the window frame along the support.

Another aspect of the disclosure is a window assembly that includes a support, a window that is movable between a closed position and an open position, a first frame portion that is connected to an inner surface of the window, and a second frame portion that is pivotally connected to the first frame portion in a nested configuration. The first frame portion pivots with respect to the second frame portion between a first angular orientation and a second angular orientation during movement of the window between the closed position and the open position. The second frame portion slides with respect to the support between a raised position and a lowered position during movement between the closed position and the open position.

Another aspect of the disclosure is a door assembly that includes a door and a support that is connected to the door and located inside the door. The door assembly also includes a window frame having a first frame portion that is connected to a second frame portion by pivot joints, wherein the second frame portion is connected to the support for relative sliding motion of the window frame between a raised position and a lowered position with respect to the door. The door assembly also includes a window that is connected to the first frame portion of the window frame for movement of the window between a first angular orientation and a second angular orientation with respect to the door. An actuator system is operable to cause movement of the window frame between the raised position and the lowered position and is operable to cause movement of the window between the first angular orientation and the second angular orientation. A pivot assembly includes a pivot link and a pivot guide, wherein the pivot link is connected to the first frame portion and the second frame portion of the window frame, and the pivot guide is connected to the actuator system and is configured to cause pivoting of the pivot link to move the window between the first angular orientation and the second angular orientation. A lock is configured to move between a locked position, in which the lock restrains motion of the window frame with respect to the support, and an unlocked position, in which the lock does not restrain motion of the window frame with respect to the support. The lock is in the locked position when the window is in the first angular orientation and the lock is in the unlocked position when the window is in the second angular orientation.

BRIEF DESCRIPTION OF THE DRAWINGS

FIGS. 3A-3D are schematic illustrations showing a window frame and a window of the window assembly.

DETAILED DESCRIPTION

This disclosure is directed to window assemblies for vehicles and to vehicles that incorporate such window assemblies. The window assemblies that are described herein include a window that can be moved between a closed (e.g., raised) position and an open (e.g., lowered) position, such as by lowering and raising the window in a generally elevational direction of the vehicle. In the closed position, the window may fully occupy and obstruct a window opening. In the open position, the window opening is partly or fully unobstructed by the window and may function to allow outside air to enter a passenger cabin of the vehicle. In the open position, the window may be partly or fully located inside a vehicle body portion, such as a door.

Typical vehicle windows are flat or have a constant-radius curvature, and are configured to move along a path having a corresponding geometric configuration. As a result, vehicle bodies often incorporate a geometric offset at the location where the window enters the vehicle body (e.g., into an interior space defined inside a door), and the window is therefore not flush with respect to the vehicle body at this location.

The window assemblies that are described herein include windows that are supported by tracks, and are configured to move along the tracks between the closed position and the open position. To allow the window to be flush with respect to the surrounding surfaces of a vehicle body when the window is in the closed position, the window is supported by a window frame having a first frame portion and a second frame portion. The first frame portion is connected to the window and pivots with respect to the second frame portion to move the window into and out of angular alignment with a window opening. When in angular alignment with the window opening, an outer surface of the window is flush with respect to an adjacent surface of a vehicle body portion. By pivoting the window inward relative to angular alignment with the window opening, the window may be lowered in to the vehicle body portion by a sliding connection of the second frame portion to the tracks.

As used herein, the term "flush" includes minor deviations from a perfectly flush configuration that are not perceptible upon casual inspection by a person. As an example, these deviations may be attributable to manufacturing and assembly deviations, such as positional deviations that are less than fifty percent of a width of the window and angular deviations of less than two degrees.

Figure 1:
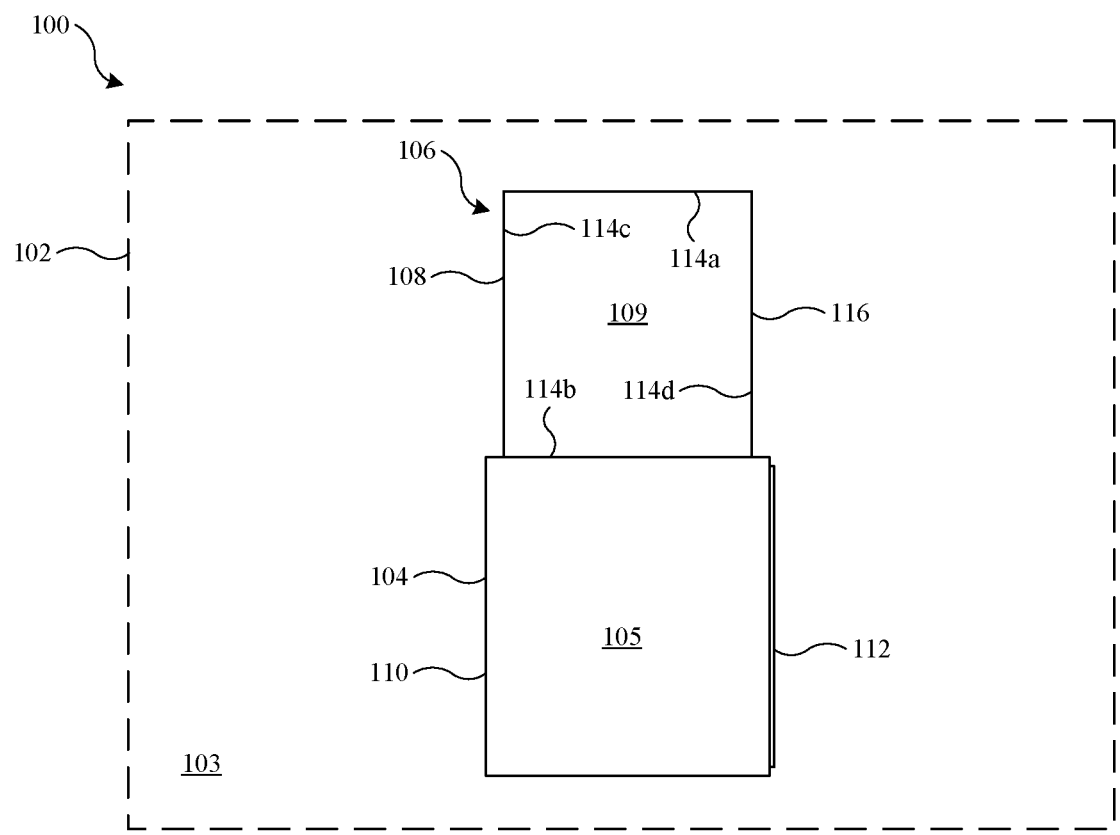
FIG. 1 is a schematic illustration of a vehicle that includes a door and a window assembly.

FIG. 1 is a schematic illustration showing part of a vehicle 100 that includes a body 102, a door 104, and a window assembly 106 that includes a window 108. The body 102 and the door 104 may be referred to as vehicle body portions (e.g., a first vehicle body portion and a second vehicle body portion). The vehicle 100 may be a road going vehicle, such as a passenger automobile or a cargo vehicle, that includes features that are typically found in conventional examples of such vehicles, such as wheels, a propulsion system, a steering system, and a suspension system.

The body 102 may include aesthetic and structural components that define at least part of an exterior of the vehicle 100. The body 102 also defines a vehicle interior, such as a passenger cabin or a cargo compartment. To allow access to the vehicle interior, the body 102 includes a door opening 110.

The door 104 is located in the door opening 110 that is defined by the body 102. The door 104 is connected to the body 102 by a hinge 112 or other structure that allows the door 104 to move between a closed position (FIG. 1), in which door 104 occupies the door opening 110, and an open position (not shown), in which the door 104 is spaced from the door opening 110 to allow access through the door opening. As an example, the hinge 112 may be a conventional door hinge of the type commonly used to mount automotive doors. Different mounting structures may be used, such as mounting structures that allow sliding of the door 104 with respect to the body 102.

The window 108 is depicted in a closed position and is movable to an open position. In the illustrated implementation, the window 108 moves primarily in an elevational direction between the closed position and the open position. Thus, the closed position may be referred to as a raised position and the open position may be referred to as a lowered position.

The window 108 is at least translucent in that part of or all of the window 108 is formed from a material, such as glass or plastic, that permits transmission of light through it. Thus, the window 108 may be or include a panel that is formed from an at least translucent material. As used herein, the term at least translucent includes both translucent and transparent materials.

An outer periphery (e.g., a peripheral edge) of the window 108 is defined by a top edge 114a, a bottom edge 114b, a first side edge 114c, and a second side edge 114d. The outer periphery of the window 108 is adjacent to and aligned with a body surface 103 of the body 102 and/or a door surface 105 of the door 104 when the window 108 is in the closed position. An outer surface 109 of the window 108 may be flush with respect to the body surface 103 and/or the door surface 105 when the window 108 is in the closed position. The window 108 or adjacent parts of the body 102 and the door 104 may include seals that seal the window 108 with respect to the body 102 and the door 104 to prevent entry of water when the window 108 is in the closed position.

In the illustrated implementation, a window opening 116 is defined by the body 102 and the door 104 in cooperation. The top edge 114a, the first side edge 114c, and the second side edge 114d of the window 108 are adjacent to the body 102 in the closed position of the window 108, and the bottom edge 114b is adjacent to the door 104 in the closed position of the window 108. Thus, in the illustrated implementation, the vehicle 100 includes a first vehicle body portion, namely the body 102, and a second vehicle body portion, namely the door 104, that cooperate to define the window opening 116. Other configurations are possible.

Figure 2:
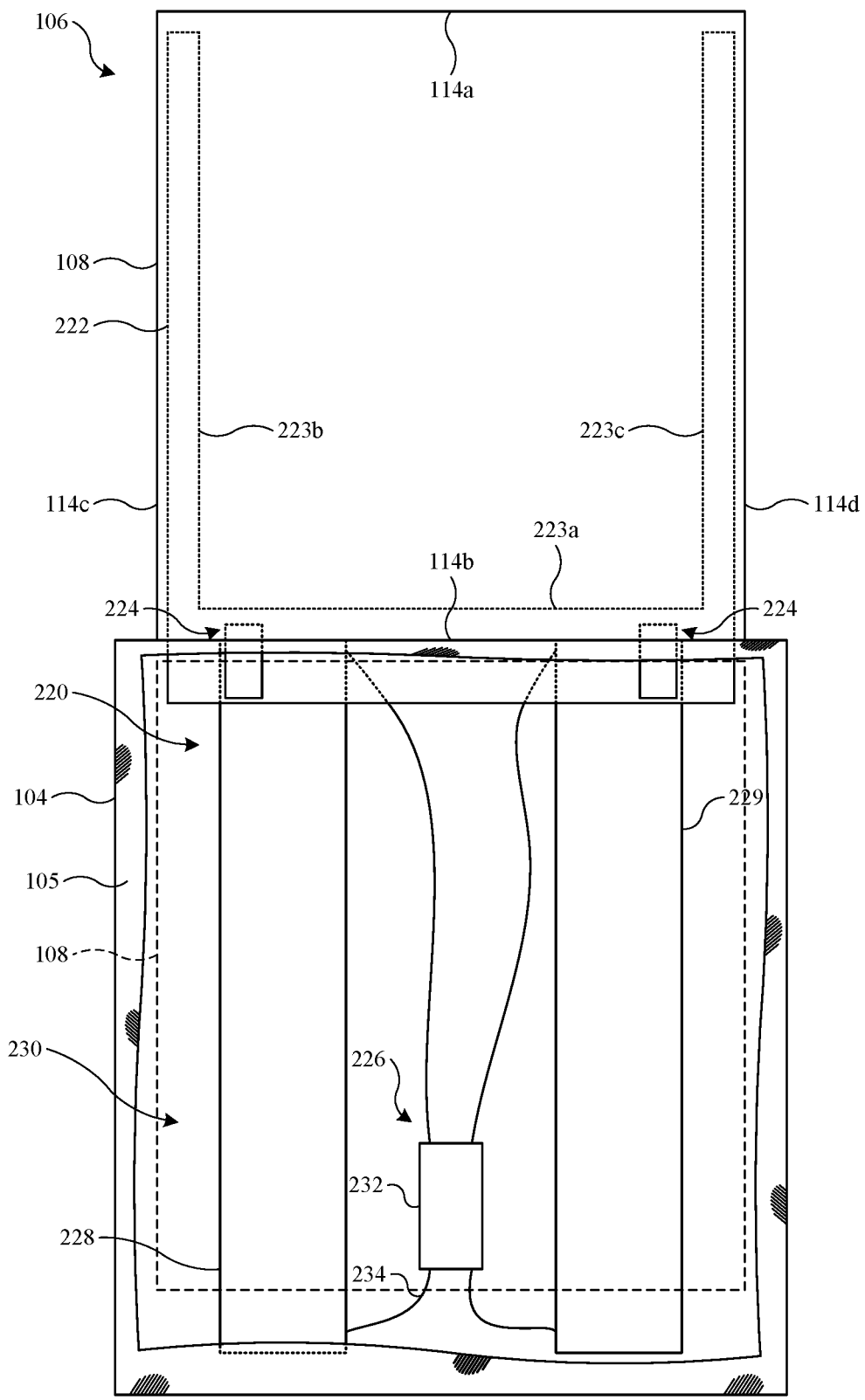
FIG. 2 is a schematic illustration of the door and the window assembly.

FIG. 2 is a schematic illustration of the door 104 and the window assembly 106. Portions of the door surface 105 of the door 104 are omitted for clarity. The window 108 is depicted in the closed position in FIG. 2, and the open position is represented by dashed lines. The window assembly 106 includes the window 108, a support 220, a window frame 222, a pivot assembly 224, and an actuator system 226.

The support 220 is configured to support the window 108 for movement between closed position and the open position by relative sliding motion of portions of the window assembly 106 along the support 220. In the illustrated implementation, the support 220 includes a first track 228 and a second track 229 that are located in an interior space 230 of the door 104 and extend primarily in the elevational direction. The first track 228 and the second track 229 are spaced from one another in a lateral direction of the door 104, for example, such that the first track 228 and the second track 229 are on opposite sides of a lateral midpoint of the door 104 and the window 108. Although two tracks are shown, alternative configurations may use a single track or three or more tracks to support the window 108. The first track 228 and the second track 229 are laterally inboard relative to the first side edge 114c and the second side edge 114d of the window 108 in the illustrated implementation, but may instead be positioned laterally outboard relative to the first side edge 114c and the second side edge 114d of the window 108 in an alternative implementation.

The support 220 may be connected to the window 108 indirectly through another structure. In the illustrated implementation, the support 220 is connected to the window 108 by the window frame 222, such as by a sliding connection of the window frame 222 to the first track 228 and the second track 229. To allow sliding connection of the window frame 222 to the first track 228 and the second track 229, features such as channels or rails that extend in the elevational direction may be formed on the first track 228 and the second track 229.

The illustrated implementation of the support 220, including the first track 228 and the second track 229, is an example that is intended to demonstrate how the support 220 may be configured to connect the window 108 to the door 104 (or other vehicle body portion) in a manner that allows elevational movement of the window 108. Thus, the window assembly 106 may include the support 220, to which the window 108 is connected, in order to support the window 108 for movement in the elevational direction between the closed position and the open position. Other mechanisms may be used to implement the support 220. In one alternative implementation, the support 220 may include rods that support the window 108 for relative sliding movement. In another alternative implementation, the support 220 may include a scissor lift mechanism that is configured to lift and lower the window 108 by extension and retraction of a scissor mechanism.

The window frame 222 is connected to the window 108, and is also connected to the support 220. The window frame 222 functions to connect the window 108 to the support 220, and also functions to provide support and rigidity to the window 108, for example, to stabilize the window against vibrations experienced when the window 108 is not engaged with the body 102 in the closed position, such as when the window 108 is located in the interior space 230 of the door 104 in the open position. In the illustrated implementation, the window frame 222 has a u-shaped configuration including a bottom portion 223a, a first side portion 223b and a second side portion 223c, which are positioned adjacent to the bottom edge 114b, the first side edge 114c, and the second side edge 114d of the window 108, respectively. The window frame 222 may have configurations other than u-shaped. As an example, the window frame 222 may have a rectangular configuration in which a top portion is added and extends between top ends of the first side portion 223b and the second side portion 223c.

The window frame 222 also functions to allow pivoting of the window 108. As will be described further herein, the pivot assembly 224 is connected to and supported by the window frame 222, and is configured to pivot the window 108 relative to the door 104 or other vehicle body portion. The actuator system 226 is connected to the window frame 222 and to the pivot assembly 224, and is configured to cause movement of the window 108 between the closed position and the open position. In the illustrated implementation, the actuator system 226 includes an actuator 232, such as an electric motor, and cables 234 (e.g., a single cable or multiple cables) that are extended and retracted by operation of the actuator 232. The cables 234 are operably connected to the window, for example, by connection of the cables to the window frame 222 and/or the pivot assembly 224, either directly or indirectly.

Figure 3A:
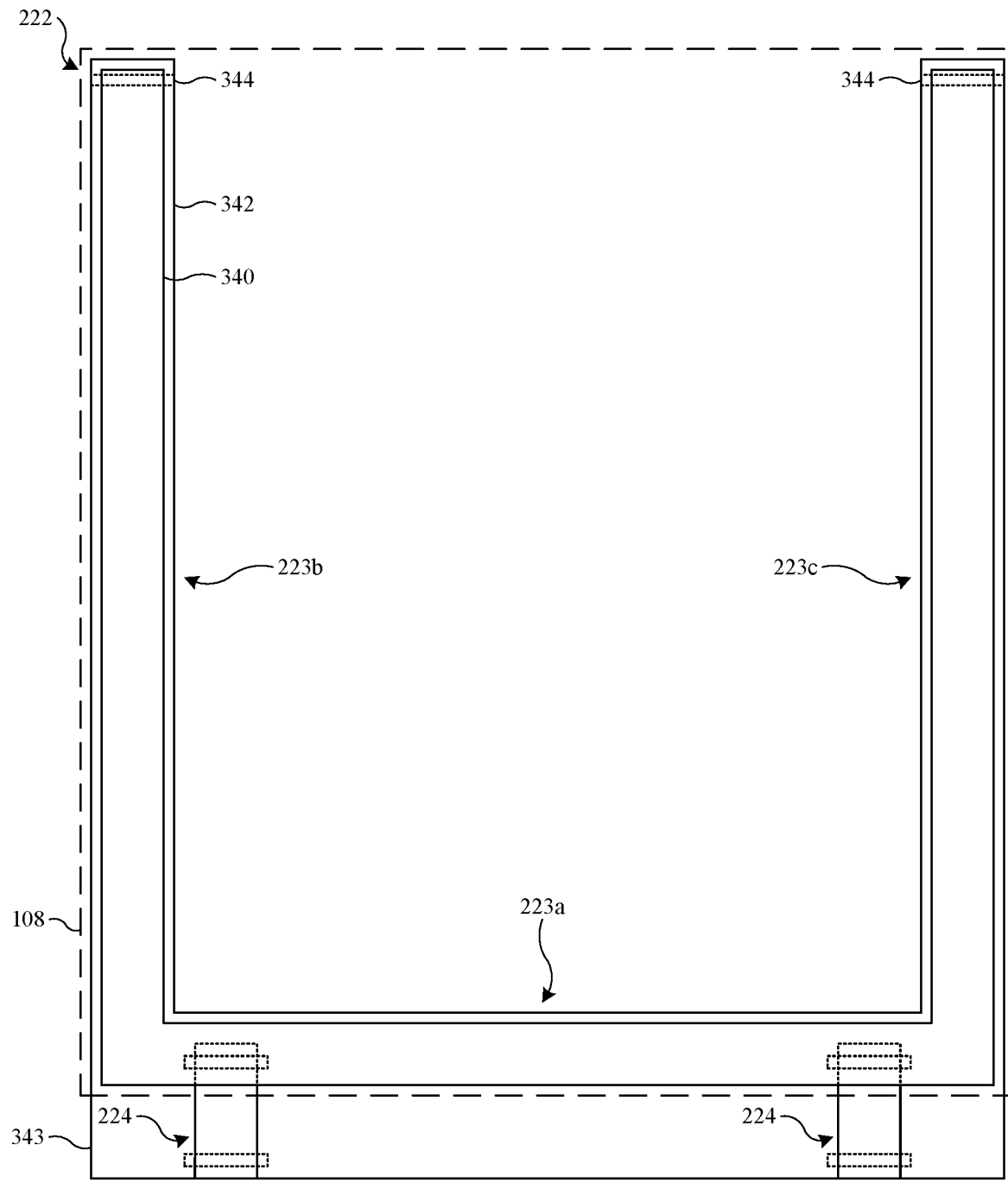
Figure 3B:
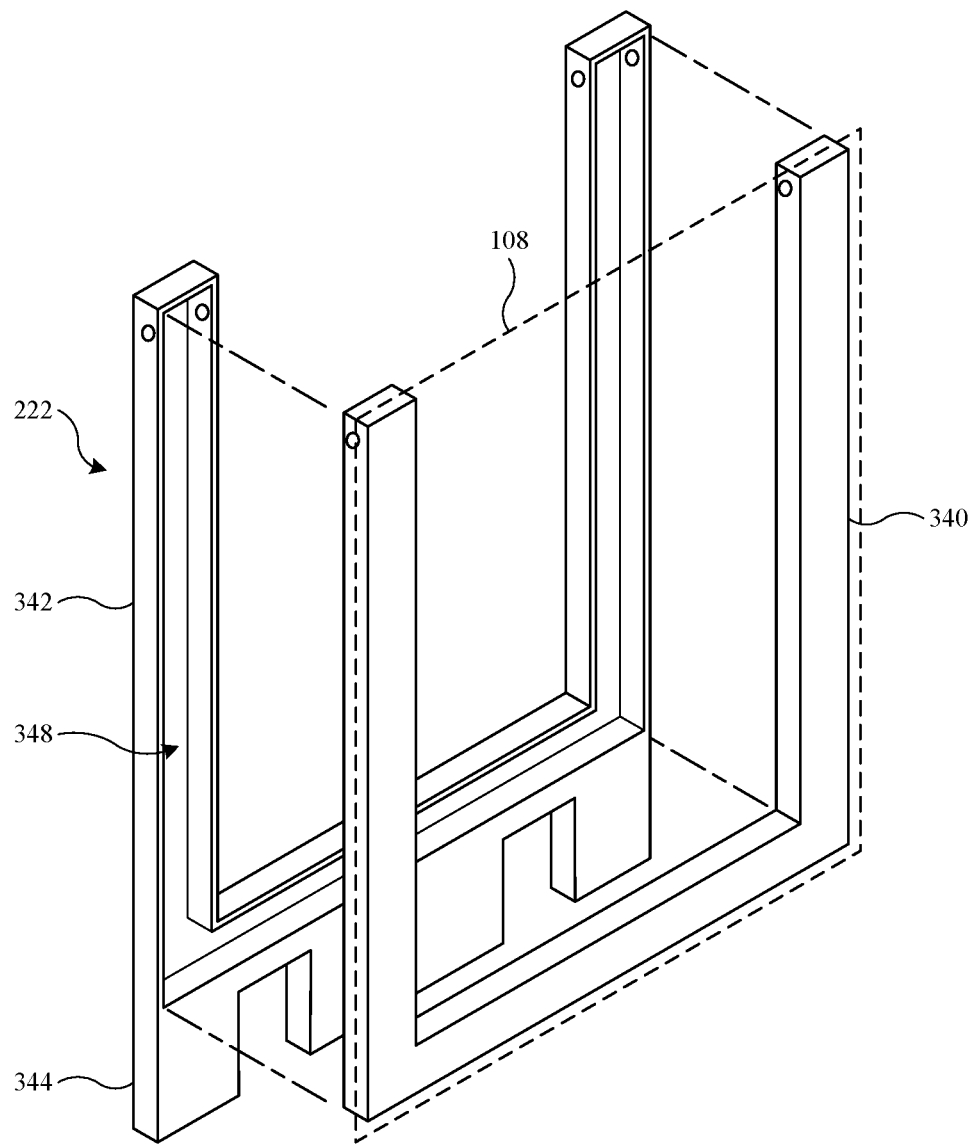

FIG. 3A is a front view of the window frame 222, and FIG. 3B is an exploded view of the window frame 222. FIG. 3C is a side view of the window frame 222 and the window 108 showing the window 108 in a first angular orientation that corresponds to the closed position of the window 108. FIG. 3D is a side view of the window frame 222 and the window 108 showing the window 108 in a second angular orientation that corresponds to the open position of the window 108. To allow pivoting of the first frame portion 340 with respect to the second frame portion 342, the first frame portion 340 is connected to the first frame portion 340 by pivot joints 344 (e.g., two of the pivot joints 344 in the illustrated implementation). The pivot joints 344 may be located near the upper ends of the first frame portion 340 and the second frame portion 342, with one of the pivot joints 344 positioned near one of the top corners of the window 108 and the other of the pivot joints 344 located near the other of the top corners of the window 108. As one example, the pivot joints 344 may be defined by pins that extend through apertures. As another example, the pivot joints 344 may be defined by complementary pairs of projections and recesses that are formed on the first frame portion 340 and the second frame portion 342.

The window frame 222 includes a first frame portion 340 and a second frame portion 342. The first frame portion 340 and the second frame portion 342 may be rigid or semi-rigid structures, and may be formed from plastic, metal, or another suitable material or combination of materials. Both of the first frame portion 340 and the second frame portion 342 may have u-shaped configurations that correspond to and define the u-shaped configuration of the window frame 222, including the bottom portion 223a, the first side portion 223b, and the second side portion 223c thereof.

The first frame portion 340 is connected to an inner surface 346 of the window 108. As examples, the first frame portion 340 may be connected to the inner surface 346 by adhesives, fasteners, or other structures. Thus, the first frame portion 340 of the window frame 222 may be mounted to the inner surface 346 of the window 108 in a fixed manner, such that the window 108 is not movable relative to the first frame portion 340, and the window 108 and the first frame portion 340 thus move in unison with one another during movement of the window 108 between the closed position and the open position. The first frame portion 340 of the window frame 222 may be positioned inward from each of the bottom edge 114b, the first side edge 114c, and the second side edge 114d of the window 108, such that the window 108 extends outward from the first frame portion 340 and the peripheral edge of the window 108 is located outward from the first frame portion 340. As will be described further herein, the first frame portion 340 is pivotally connected to the second frame portion 342 such that the first frame portion 340 pivots with respect to the second frame 342 portion between the first angular orientation and the second angular orientation during movement of the window 108 between the closed position and the open position.

The second frame portion 342 of the window frame 222 is connected to the support 220 and is pivotally connected to the first frame portion 340 of the window frame 222 in a nested configuration. The second frame portion 342 is connected to the support 220 in a manner that allows the support 220 to facilitate movement of the window frame 222 with respect to the door 104, such as by relative sliding motion in the elevational direction between the closed and open positions by sliding downward from the closed position toward the open position and by sliding upward from the open position toward the closed position. As an example, the second frame portion 342 may be include features that define a sliding connection with the first track 228 and the second track 229 such as projections that are defined on the second frame portion 342 and extend into complementary channels that are defined by the first track 228 and the second track 229. Thus, the connection of the second frame portion 342 to the first track 228 and the second track 229 of the support 220 allows the second frame portion to move (e.g., by sliding) with respect to the support 220 between a raised position and a lowered position with respect to the support 220 during movement of the window 108 between the closed position and the open position.

To allow connection of the second frame portion 342 to the support 220, the second frame portion 342 includes a base portion 343 that extends downward relative to the remainder of the second frame portion 342 and extends downward past the bottom edge 114b of the window 108 so that the base portion 343 of the second frame portion 342 extends into the interior space 230 of the door 104 in both of the closed position and the open position of the window 108. The pivot assembly 224 is connected to the base portion 343 of the second frame portion 342 and is also connected to the first frame portion 340 in order to control pivoting of the first frame portion 340 with respect to the second frame portion 342, as will be described further herein.

As best seen in FIG. 3B, the second frame portion 342 defines a channel 348. The channel 348 may extend in a u-shaped configuration equivalent to the u-shaped configuration that is defined by the bottom portion 223a, the first side portion 223b, and the second side portion 223c of the second frame portion 342. As an example, the channel 348 may be defined by wall portions of the second frame portion 342. The channel 348 is sized and configured to allow the first frame portion 340 to be located partly within the channel 348, and the channel 348 therefore facilitates nesting of the first frame portion 340 within the second frame portion 342. Thus, the first frame portion 340 may be located inside the channel of the second frame portion 342 in a nested configuration that is defined by the first frame portion 340 and the second frame portion 342. Accordingly, the first frame portion 340 is nested within the channel 348 of the second frame portion 342, which avoids having a gap between the first frame portion 340 and the second frame portion 342 that would vary in size during pivoting movement of the first frame portion 340 with respect to the second frame portion 342. As a result, the first frame portion 340 is at least partly hidden from view by the second frame portion 342 when viewed from the vehicle interior of the vehicle 100 (e.g., from the perspective of persons who are located inside the vehicle 100). Instead, the second frame portion 342 is visible to the persons who are located inside the vehicle 100, and a decorative surface may be formed on the second frame portion 342 to enhance aesthetics.

As best seen in FIGS. 3C-3D, connection of the first frame portion 340 to the second frame portion 342 by the pivot joints 344 allows the first frame portion 340 and the window 108 to rotate around a rotation axis defined by the pivot joints 344 between the first angular orientation (FIG. 3C) and the second angular orientation (FIG. 3D). Movement between the first angular orientation and the second angular orientation is caused by and controlled by operation of the pivot assembly 224, as will be described further herein. The first angular orientation corresponds to the closed position of the window 108, and the window 108 is in the first angular orientation when it is in the closed position. In the first angular orientation, the window 108 is in alignment with the window opening 116. Thus, the first angular orientation also places the outer surface 109 of the window 108 in alignment with the body surface 103 of the body 102 and/or in alignment with the door surface 105 of the door 104. The second angular orientation corresponds to the open position of the window 108, and the window 108 is also placed into the second angular orientation during movement of the window 108 between the closed position and the open position. In the second angular orientation, the window 108 is pivoted inward relative to the window opening 116, which places the window 108 out of alignment with respect to the body surface 103 of the body 102 and with respect to the door surface 105 of the door 104. Measured relative to the pivot joints 344 as the center of rotation of the window 108, the second angular orientation may differ from the first angular orientation by between one half of a degree and five degrees.

The window 108 is moved from the first angular orientation to the second angular orientation in order to move the window from the closed position toward the open position, prior to movement of the window 108 downward into the interior space 230 of the door 104. Similarly, during movement from the open position toward the closed position, the window 108 is moved upward prior to pivoting from the second angular orientation back to the first angular orientation to return to the closed position.

Figure 4A:
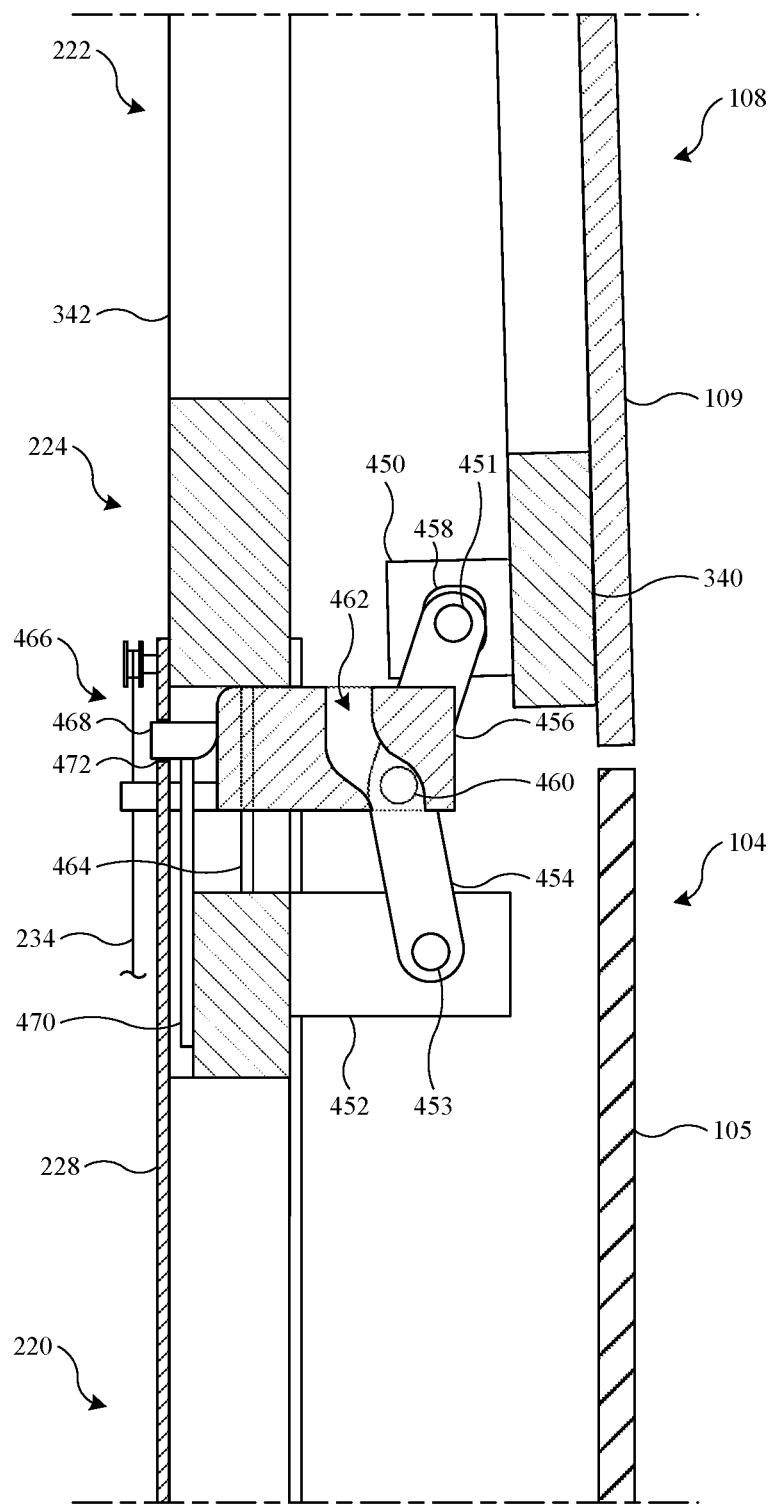
FIGS. 4A-4C are schematic illustrations showing a pivot assembly and a locking mechanism of the window assembly.
Figure 4B:
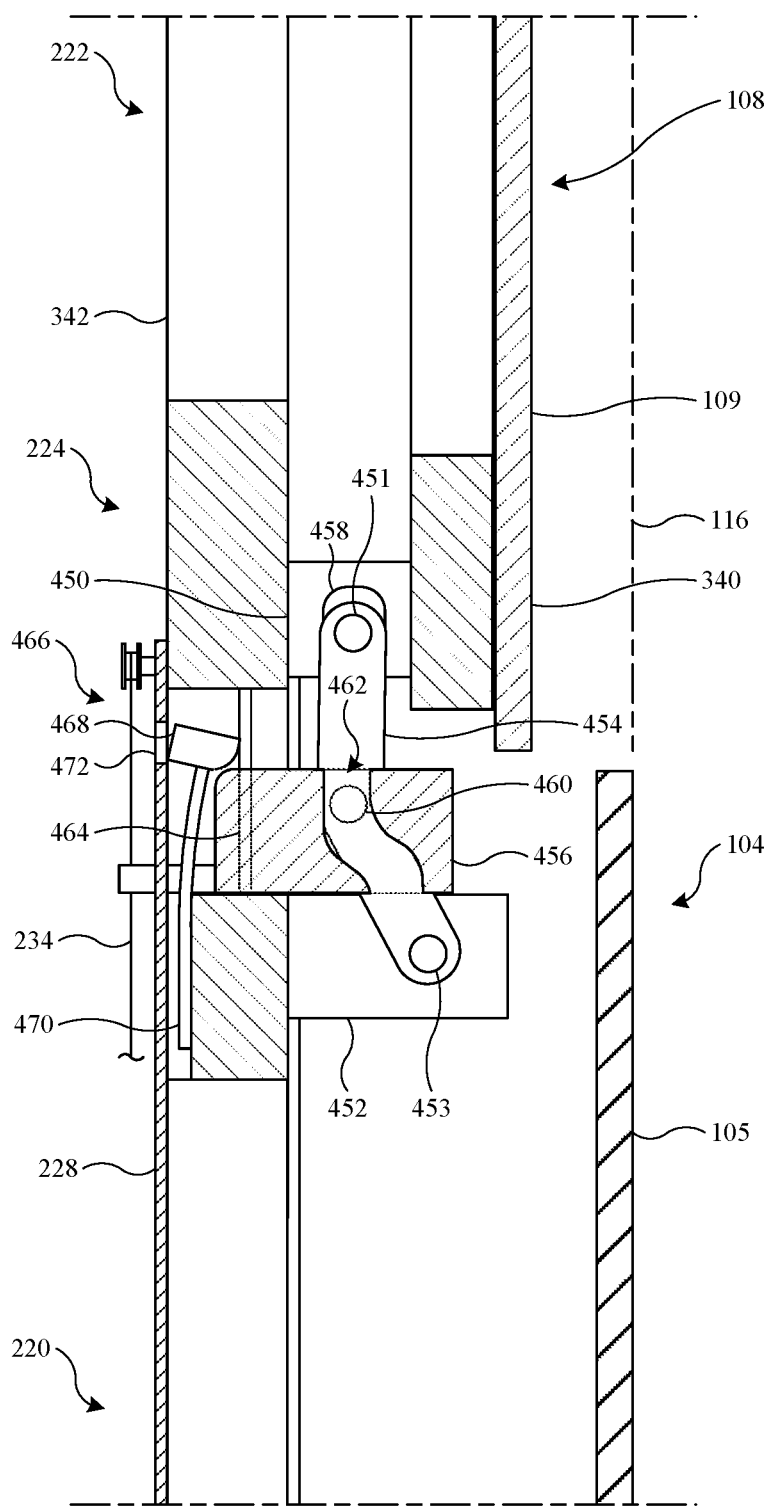
Figure 4C:
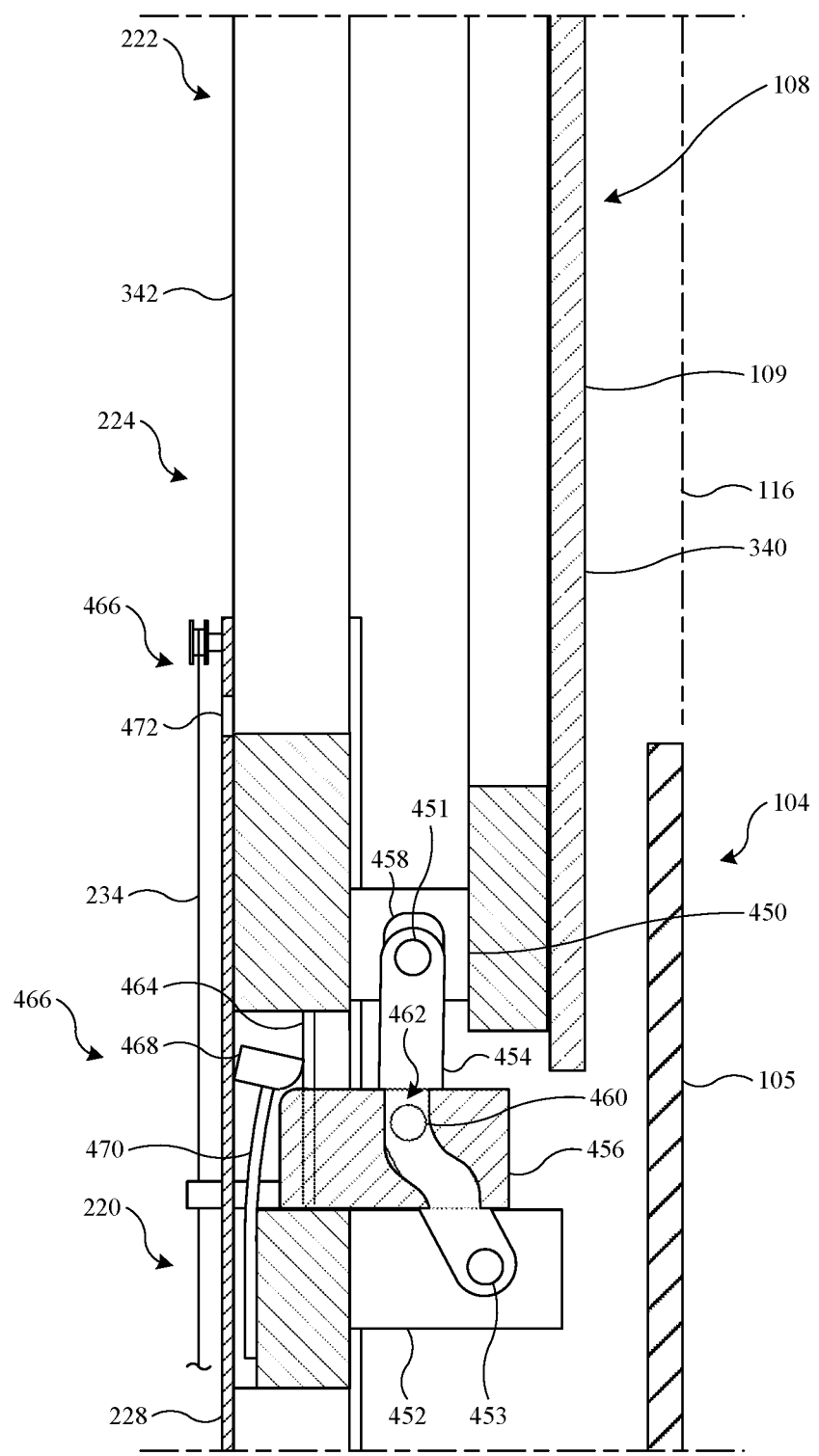

Movement of the window 108 between the first angular orientation and the second angular orientation is controlled by the pivot assembly 224, which is best seen in FIGS. 4A-4C. The pivot assembly 224 is configured to move the window 108 between the first angular orientation, in which the window 108 is in alignment with the window opening 116, and the second angular orientation, in which the window 108 is pivoted inward relative to the window opening 116 and is not in alignment with the window opening 116. In FIG. 4A, the window is in the closed position, in which the window 108 is in the first angular orientation, and the window 108 and the window frame 222 are in the raised position with respect to the support 220. In FIG. 4B, the window 108 has been moved to the second angular orientation by operation of the pivot assembly 224, and the window 108 and the window frame 222 remain in the raised position with respect to the support 220. In FIG. 4C, the window 108 remains in the second angular orientation and the window 108 and the window frame 222 have moved downward from the raised position toward the lowered position with respect to the support 220.

The pivot assembly 224 includes a first frame mount 450, a second frame mount 452, a pivot link 454, and a pivot guide 456. The first frame mount 450 is a base portion of the pivot assembly 224 and serves as a primary structural connection of the pivot assembly 224 to the first frame portion 340 of the window frame 222. The first frame mount 450 may be rigidly connected to the first frame portion 340, such as by fasteners, so that it is not movable relative to the first frame portion 340. Alternatively, the first frame mount 450 may be an integrally formed part of the first frame portion 340. The second frame mount 452 is a base portion of the pivot assembly 224 and serves as a primary structural connection of the pivot assembly 224 to the second frame portion 342 of the window frame 222. The second frame mount 452 may be rigidly connected to the second frame portion 342, such as by fasteners, so that it is not movable relative to the second frame portion 342. Alternatively, the second frame mount 452 may be an integrally formed part of the second frame portion 342.

The pivot link 454 is connected to the first frame portion 340 and the second frame portion 342 of the window frame 222. The first frame mount 450 serves as a mounting structure by which the pivot link 454 is pivotally connected to the first frame portion 340. The second frame mount 452 serves as a mounting structure by which the pivot link 454 is pivotally connected to the second frame portion 342. In the illustrated implementation, a first end of the pivot link 454 is connected to the first frame mount 450 by a first pivot joint 451, and a second end of the pivot link 454 is connected to the second frame mount 452 by a second pivot joint 453. As an example, the first pivot joint 451 and the second pivot joint 453 may be implementing structures using structures such as pins, axles, or projections and complementary recesses.

One of the first pivot joint 451 or the second pivot joint 453 may be configured to allow a limited amount of sliding relative to the first frame mount 450 or the second frame mount 452, in order to avoid over constraining motion of the second frame mount 452 relative to the first frame mount 450. As an example, the first pivot joint 451 may be a pin or projection that extends into a slot 458 that is formed on the first frame mount 450 to allow limited sliding of the first pivot joint 451 with respect to the first frame mount 450 during pivoting of the pivot link 454 with respect to the second pivot joint 453 as the window 108 moves between the first angular orientation and the second angular orientation. Alternatively, compliance may be integrated into another portion of the assembly, such as at the pivot joints 344 between the first frame portion 340 and the second frame portion 342, in order to avoid over constraining the second frame portion 342.

The pivot guide 456 is configured to control the angle of the pivot link 454 with respect to the second frame mount 452 by movement of the pivot guide 456 with respect to the second frame mount 452 and the pivot link 454. The pivot link 454 pivots with respect to the second frame mount 452 during movement of the window 108 between the first angular orientation and the second angular orientation. Thus, by controlling the angle of the pivot link 454 with respect to the second frame mount 452, the pivot guide 456 controls movement of the window 108 between the first angular orientation and the second angular orientation. The angle of the pivot link 454 is controlled by engagement of the pivot guide 456 with the pivot link 454. A guide feature, such as a guide roller 460, is formed on or connected to the pivot link 454. The guide roller 460 is disposed in a slot 462 that is defined by the pivot guide 456. The slot 462 includes contoured surfaces that are configured to change the position (e.g., in an inboard/outboard direction) of the guide roller 460 as the pivot guide 456 moves elevationally with respect to the guide roller 460.

So that the pivot guide 456 may move elevationally with respect to the pivot link 454 and the guide roller 460, the pivot guide 456 is connected to the second frame portion 342 of the window frame 222 by a sliding mount 464. The sliding mount 464 allows the pivot guide 456 to move along a limited range of translational movement in the elevational direction. Limits on the upward and downward travel of the pivot guide 456 relative to the second frame portion 342 may be imposed by engagement of the pivot guide 456 with surrounding structures as it moves to upper and lower ends of the sliding mount 464. As an example, an upper travel limit of the pivot guide 456 along the sliding mount 464 may be defined by engagement of the pivot guide 456 with a surface or feature formed on the second frame portion 342, and a lower travel limit of the pivot guide 456 along the sliding mount 464 may be defined by engagement of the pivot guide 456 with a surface or feature formed on the second frame mount 452 (or alternatively with a surface or feature formed on the second frame portion 342). The sliding mount 464 may be defined by complementary features formed on the pivot guide 456 and the second frame portion 342 (or a structure fixed thereto, such as the second frame mount 452), such as pins or projections that are engaged with complementary tracks or slots. In the illustrated implementation, the pivot guide 456 is located at or near the upper end of travel along the sliding mount 464 when the window 108 is in the first angular orientation, and the pivot guide 456 is located at or near the lower travel limit along the sliding mount 464 when the window 108 is in the second angular orientation.

To move the pivot guide 456 with respect to the second frame portion 342, the pivot guide 456 is connected to the actuator system 226, such as by connection of the cables 234 to a portion of the pivot guide 456. In the illustrated example, a feature formed on the pivot guide 456 extends through a slot or other opening defined by the first track 228 of the support 220 to allow connection of the pivot guide 456 to the cables 234. As another example, a portion of the cables 234 could extend within a channel defined by the first track 228 for connection to the pivot guide 456. Other configurations are possible. Thus, the pivot assembly 224 includes the pivot link 454, which is connected to the first frame portion 340 and the second frame portion 342, and also includes the pivot guide 456, which is connected to the actuator system 226 so that operation of the actuator system moves the pivot guide 456 and causes the pivot link 454 to pivot in response to interaction of the pivot guide 456 with the pivot link 454. As an example, the pivot guide 456 may incorporate surfaces having a geometric profile that functions as a cam to cause pivoting of the pivot link 454 in response interaction of the surfaces of the pivot guide 456 with a feature on the pivot link 456 that functions as a cam follower as the pivot guide 456 moves elevationally. Operation of the actuator system 226 also causes movement of the window 108 and the window frame 222 between the raised position and the lowered position with respect to the support 220, as will be described.

The pivot assembly 224 also includes a lock 466 (e.g., a locking mechanism) that is configured to move between a locked position (FIG. 4A), in which the lock 466 restrains sliding motion of the second frame portion 342 of the window frame 222 with respect to the support 220, and an unlocked position (FIGS. 4B-4C), in which the lock 466 does not restrain sliding motion of the second frame portion 342 of the window frame 222 with respect to the support 220. The lock 466 is in the locked position when the window 108 is in the first angular orientation and the lock 466 is in the unlocked position when the window is in the second angular orientation.

The lock 466 is configured to selectively restrain movement of the window frame 222 with respect to the support 220 dependent on the position of the pivot guide 456, and thus dependent on the angular orientation of the window 108. In particular, the pivot guide 456 is configured to slide with respect to the second frame portion 342 between a first position and a second position. The first position corresponds to the upper travel limit of the pivot guide 456, the first angular orientation of the window 108, and the locked position of the lock 466. The second position corresponds to the lower travel limit of the pivot guide 456, the second angular orientation of the window 108, and the unlocked position of the lock 466.

In the illustrated implementation, the lock 466 includes an engagement structure 468 and a leaf spring 470. The engagement structure is rigid structure that is coupled to an end of the leaf spring 470, and an opposite end of the leaf spring 470 is connected to the second frame mount 452 or otherwise supported for movement in unison with the second frame portion 342. The engagement structure 468 is spring biased away from the first track 228 by the leaf spring 470, and is receivable in an aperture 472 that is formed in the first track 228 when the engagement structure 468 is elevationally aligned with the aperture 472, which occurs in the raised position (a similar configuration may be used for connection of the pivot assembly 224 to the second track 229). In the locked position, the engagement structure 468 is disposed in the aperture 472 formed in the first track 228, and engagement of the engagement structure with the aperture 472 retrains the window frame 222 and the window 108 from moving with respect to the support 220, thereby maintaining the window frame 222 and the window 108 in the raised position while the lock 466 is in the locked position.

The actuator system 226 is operable to cause movement of the window frame 222 between the raised position and the lowered position and is also operable to cause movement of the window 108 between the first angular orientation and the second angular orientation through the connection of the actuator 232 to the pivot guide 456 by the cables 234. While the window 108 is in the first angular orientation, the pivot guide 456 is in the first position, near the upper travel limit of the pivot guide 456, which engages the pivot guide 456 with the engagement structure 468. Engagement of the pivot guide 456 with the engagement structure 468 holds the engagement structure 468 in the aperture 472 and maintains the locked position (FIG. 4A) of the lock 466. Operation of the actuator system 226 to move the pivot guide 456 downward relative to the second frame portion 342 pivots the window 108 from the first angular orientation to the second angular orientation, which is reached as the pivot guide 456 reaches the second position, at lower travel limit of the pivot guide 456 with respect to the second frame portion 342. When the pivot guide 456 reaches the second position, it has moved downward relative to the engagement structure 468 and no longer holds the engagement structure 468 in the aperture 472. As a result, the biasing force of the aperture 472 causes the engagement structure 468 to move out of the aperture 472 when the engagement structure 468 reaches the second position. This places the lock 466 in the unlocked position (FIG. 4B).

Further operation of the actuator system 226 may pull the pivot guide 456 downward through force applied by the cables 234, and this force is transferred to the window frame 222 since the pivot guide 456 is at the lower limit of travel (FIG. 4C). Continued operation of the actuator system 226 may move the window frame 222 and the window 108 further downward toward the lowered position of the window frame 222 relative to the support 220, corresponding to the open position of the window 108.

When operation of the actuator system 226 is reversed to apply an upward force to the pivot guide 456 through the cables 234, this force is transferred to the window frame 222 by the pivot guide 456. In particular, movement of the pivot guide 456 with respect to the second frame portion 342 is blocked by engagement of the pivot guide 456 with the engagement structure 468, which is positioned in the first track 228 and the second track 229 while the lock 466 is in the unlocked position, causing the upward force applied by the cables 234 to be applied to moving the window frame 222 upward toward the raised position. As the window frame 222 reaches the raised position, the engagement structure 468 reaches alignment with the aperture 472, and the engagement of the pivot guide 456 with the engagement structure 468 forces the engagement structure 468 into the aperture 472 against the biasing force applied to the engagement structure 468 by the leaf spring 470. As the engagement structure 468 moves into the aperture 472 as a result of the spring force applied by the leaf spring 470, the locked position of the window frame 222 with respect to the support 220 is reached, and the engagement structure 468 is moved partly or fully out of the first track 228 so that it no longer restrains the pivot guide 456 from moving upward relative to the second frame portion 342. As a result, the pivot guide 456 moves from the second position to the first position, thereby pivoting the window 108 from the second angular orientation to the first angular orientation, and thereby returning the window 108 to the closed position. It should be noted that the engagement structure 468 is shown as interacting with the aperture 472 formed on the first track 228, but this structure may be located on either or both of the first track 228 and the second track 229.

As described above, one aspect of the present technology is the gathering and use of data available from various sources for use during operation of a vehicle. As an example, such data may identify the user and include user-specific settings or preferences. The present disclosure contemplates that in some instances, this gathered data may include personal information data that uniquely identifies or can be used to contact or locate a specific person. Such personal information data can include demographic data, location-based data, telephone numbers, email addresses, twitter ID's, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, a user profile may be established that stores preference related information that allows settings of the vehicle, such as window position, to be adjusted automatically according to the preference related information. Accordingly, use of such personal information data enhances the user's experience.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of storing a user profile for automatic adjustment of vehicle systems according to user preference information, the present technology can be configured to allow users to select to "opt in" or "opt out" of participation in the collection of personal information data during registration for services or anytime thereafter. In another example, users can select not to provide data regarding usage of specific applications. In yet another example, users can select to limit the length of time that application usage data is maintained or entirely prohibit the development of an application usage profile. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data at a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, user preference information may be determined each time the vehicle is used, and without subsequently storing the information or associating with the particular user.

What is claimed is:

1. A window assembly, comprising:
    a support;
    a window frame having a first frame portion pivotally connected to a second frame portion by pivot joints that are located at upper ends of the first frame portion and the second frame portion, wherein the second frame portion is connected to the support for movement with respect to the support; and
    a window connected to the first frame portion of the window frame, wherein the pivot joints are located near a top edge of the window, and wherein the window is movable between a closed position, in which an outer surface of the window is flush relative to a body surface of a vehicle body portion, and an open position by pivoting of the window and the first frame portion of the window frame with respect to the second frame portion of the window frame and by relative sliding motion of the first frame portion and the second frame portion of the window frame along the support.

2. The window assembly of claim 1, further comprising:
    an actuator system; and
    a pivot assembly that includes a pivot link that is connected to the first frame portion and the second frame portion and a pivot guide that is connected to the actuator system so that operation of the actuator system moves the pivot guide and causes the pivot link to pivot in response to interaction of the pivot guide with the pivot link.

3. The window assembly of claim 2, wherein the pivot assembly is configured to move the window between a first angular orientation, in which the window is in alignment with a window opening, and a second angular orientation, in which the window is pivoted inward relative to the window opening.

4. The window assembly of claim 3, wherein the pivot assembly includes a lock that is configured to move between a locked position, in which the lock restrains motion of the second frame portion of the window frame with respect to the support, and an unlocked position, in which the lock does not restrain motion of the second frame portion of the window frame with respect to the support.

5. The window assembly of claim 4, wherein the lock is in the locked position when the window is in the first angular orientation and the lock is in the unlocked position when the window is in the second angular orientation.

6. The window assembly of claim 4, wherein the pivot guide is connected to the actuator system and is configured to slide with respect to the second frame portion between a first position and a second position, the first position of the pivot guide corresponds to the first angular orientation of the window and to the locked position of the lock, and the second position of the pivot guide corresponds to the second angular orientation of the window and to the unlocked position of the lock.

7. The window assembly of claim 1, wherein the window is movable between a raised position and a lowered position with respect to the support by a sliding connection of the second frame portion to the support.

8. The window assembly of claim 1, wherein the support includes a first track and a second track, and the window frame is configured to slide with respect to the first track and the second track.

9. The window assembly of claim 1, wherein the window is located inside the vehicle body portion when the window is in the open position.

10. The window assembly of claim 1, wherein the first frame portion is hidden from view by the second frame portion when viewed from a location inboard of the window assembly.

11. The window assembly of claim 1, wherein a first pivot joint is located at a first upper corner of the window and a second pivot joint is located at an opposing second upper corner of the window.

12. The window assembly of claim 1, wherein the first frame portion is configured to pivot with respect to the second frame portion based upon the relative sliding motion of the first frame portion and the second frame portion along the support.

13. The window assembly of claim 1, wherein the closed position of the window corresponds to a first angular orientation of the window and the open position of the window corresponds to a second angular orientation of the window.

14. A window assembly, comprising:
    a support that includes a first track and a second track;
    a window that is movable between a closed position, in which an outer surface of the window is flush relative to a body surface of a vehicle body portion, and an open position in which the window is located inside the vehicle body portion;
    a first frame portion that is connected to an inner surface of the window; and
    a second frame portion that is pivotally connected to the first frame portion in a nested configuration,
    wherein the second frame portion defines a channel, and at least part of the first frame portion is located in the channel,
    wherein the first frame portion pivots with respect to the second frame portion between a first angular orientation and a second angular orientation during movement of the window between the closed position and the open position, and
    wherein the second frame portion slides with respect to the first track and the second track between a raised position and a lowered position during movement between the closed position and the open position.

15. The window assembly of claim 14, wherein the first frame portion and the second frame portion each have a u-shaped configuration positioned adjacent to a bottom edge of the window, a first side edge of the window, and a second side edge of the window.

16. The window assembly of claim 14, wherein the first frame portion is connected to the second frame portion by pivot joints that are located at upper ends of the first frame portion and the second frame portion.

17. A door assembly, comprising:
    a door;

a support that is connected to the door and located inside the door, and that includes a first track and a second track;

a window frame having a first frame portion that is connected to a second frame portion by pivot joints, wherein the second frame portion is connected to the first frame portion in a nested configuration and the second frame portion is connected to the support and configured to slide with respect to the first track and the second track for relative sliding motion of the window frame between a raised position and a lowered position with respect to the door;

a window that is connected to the first frame portion of the window frame for movement of the window between a closed position with respect to the door, which corresponds to a first angular orientation of the window and to the raised position of the window frame, and an open position with respect to the door, which corresponds to a second angular orientation of the window and to the lowered position of the window frame with respect to the door, wherein the window is located inside the door when the window is in the open position and an outer surface of the window is flush relative to a door surface of the door when the window is in the closed position;

an actuator system that is operable to cause movement of the window frame between the raised position and the lowered position and operable to cause movement of the window between the first angular orientation and the second angular orientation;

a pivot assembly that includes a pivot link and a pivot guide, wherein the pivot link is connected to the first frame portion and the second frame portion of the window frame, and the pivot guide is connected to the actuator system and is configured to cause pivoting of the pivot link to move the window between the first angular orientation and the second angular orientation; and a lock that is configured to move between a locked position, in which the lock restrains motion of the window frame with respect to the support, and an unlocked position, in which the lock does not restrain motion of the window frame with respect to the support, wherein the lock is in the locked position when the window is in the first angular orientation and the lock is in the unlocked position when the window is in the second angular orientation.

18. The door assembly of claim 17, wherein:

the second frame portion defines a channel, and at least part of the first frame portion is located in the channel, and the first frame portion and the second frame portion each have a u-shaped configuration.

19. The door assembly of claim 17, wherein the first frame portion is at least partly hidden from view by the second frame portion.

* * * * *